United States Patent
DeYoung (10) Patent No.: US 7,526,812 B2
(45) Date of Patent: Apr. 28, 2009

(54) SYSTEMS AND METHODS FOR MANIPULATING RIGHTS MANAGEMENT DATA

(75) Inventor: Dennis C. DeYoung, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 859 days.

(21) Appl. No.: 11/088,958

(22) Filed: Mar. 24, 2005

(65) Prior Publication Data

US 2006/0218643 A1    Sep. 28, 2006

(51) Int. Cl.
G06F 21/00 (2006.01)
(52) U.S. Cl. .................. 726/26; 726/2; 726/4; 726/27; 726/28; 726/29; 726/30; 726/31; 726/32; 726/33; 380/51
(58) Field of Classification Search .................... 726/2, 726/4, 26–33; 380/51
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 7,093,296 | B2 * | 8/2006 | Nusser et al. | 726/26 |
| 7,315,946 | B1 * | 1/2008 | Blumenfeld et al. | 713/175 |
| 7,353,402 | B2 * | 4/2008 | Bourne et al. | 713/193 |
| 7,359,884 | B2 * | 4/2008 | Ta et al. | 705/59 |
| 7,376,975 | B2 * | 5/2008 | Lafornara et al. | 726/27 |
| 7,386,513 | B2 * | 6/2008 | Lao et al. | 705/51 |
| 7,392,537 | B2 * | 6/2008 | Satomaa et al. | 726/11 |
| 2004/0117215 | A1 * | 6/2004 | Marchosky | 705/3 |
| 2004/0267552 | A1 * | 12/2004 | Gilliam et al. | 705/1 |
| 2005/0262568 | A1 * | 11/2005 | Hansen et al. | 726/26 |
| 2006/0047974 | A1 * | 3/2006 | Alpern et al. | 713/191 |

* cited by examiner

Primary Examiner—Tongoc Tran
(74) Attorney, Agent, or Firm—Oliff & Berridge, PLC (57) ABSTRACT

Documents can be created to include metadata associated with rights management information that applies to the entire document and/or to one or more applicable sub-portions of the document. When a user places such a document to be scanned on a multi-function device (MFD) in a rights management environment, the MFD recognizes metadata associated with user rights management regarding the document and/or applicable sub-portions. The MFD automatically commences a rights management scheme to authenticate the user to a rights management system, query such system for information and permissions related to the document and/or applicable sub-portions, including deciphering the metadata read from the document, and determine if the user-requested function, such as scanning or copying, is permitted to be undertaken on this document and/or applicable sub-portions by this user on this device at this time. The system automatically executes or aborts the user-requested function based on the imposed rights management scheme.

30 Claims, 3 Drawing Sheets

SYSTEMS AND METHODS FOR MANIPULATING RIGHTS MANAGEMENT DATA

BACKGROUND

This disclosure is directed to automatic manipulation of information, particularly information with which a rights management hierarchy is associated, and more particularly where such rights management information is automatically readable from and/or writeable to hard-copy documents.

With the proliferation of electronic information systems, from small systems such as personal computers, personal digital assistants, and/or cellular telephones to sophisticated networks with multiple servers and potentially large numbers of users, there is an ever-increasing need for individual and/or networked system protection. Such protection takes on many forms. Among these are protection of the configuration and/or operating systems of such devices from intrusion, or from unauthorized or inadvertent modification. Additionally, methodologies are required to protect such devices from unauthorized use, and/or to secure data and/or images produced in, reproduced by, transferred through, transmitted by, or stored in the devices. Objectives of system protection schemes include protecting the integrity of an individual device, and/or system to which the device may be connected, and/or to protect data and/or images produced in, reproduced by, and/or stored in the device or system, thus securing user, and/or user organization, information from being freely accessible to those from whom an individual user or user organization may choose to restrict such information.

"Digital Rights Management" (DRM) refers broadly to schemes and methodologies for restricting access to information stored in electronic devices, particularly digital data and/or image producing and/or reproducing devices. Some scheme or methodology of rights management is enforced within the electronic device. DRM includes a concept as simple as individual password protection for access to data and/or functionalities available in a specific electronic device. In such cases, passwords are individually user-defined by an owner and/or primary user of a specific electronic device. DRM also refers to a complex hierarchy of rights management methodologies and/or schemes housed in or associated with software configuration functions and/or data access, and/or data and image production and/or reproduction capabilities, of an electronic device, either standing alone, or associated with a network. It is commonly understood that network administrators have more in-depth access to systems for system configuration, upgrade or other related services. An administrator must step through a simple or complex identification scheme to gain this more in-depth access to the system within the DRM hierarchy for the system.

In data and/or image producing systems, including High Integrity Document (HID) systems, electronic documents are produced or stored that need to be protected from unauthorized access. Most digital data production and storage devices associate with electronically readable data or images certain other data, often referred to as metadata. This metadata generally represents a separate class of data that is included within a digital data file. The metadata may describe more fully, in some electronic form, characteristics associated with the data that is actually intended to be read. The metadata may include, but is not limited to, file properties such as, for example: a system recognized title of a document that may be different from a hard-copy title, separately ascribed to the document or file; document owner identification data; and/or document production or revision data, such as, for example, when the document may have been created, saved, edited, or printed. This metadata may not appear in the document itself when digitally reproduced on a digital display device and/or when produced as a hard-copy document. This metadata is, however, permanently associated with, and possibly automatically updated in, the electronic file which includes the document. Metadata can be printed in machine and/or human readable form on a hard-copy version of the document. DRM information that a user or user organization may desire to associate with a specific electronic file may be included with that file as a part of the associated file metadata.

SUMMARY

As DRM shifts from being focused on purely electronic and/or digital control of information, the concepts which underlie DRM may find some utility with respect to varying capabilities associated with information protection of produced hard-copy documents. Such transition is, in fact, occurring in industry today where the concept of DRM as it applies to other than digital information protection, and in particular to protection of information produced as a hard-copy output document, is often referred to as Enterprise Rights Management (ERM).

ERM is concerned with persistent protection of information. Information protection and management rights are enforced no matter where the data exists. Based on cryptographic technologies to secure data from unauthorized users or uses, ERM is essentially fine-grained control over who can do what with information within the ERM environment. As such, an ERM scheme is capable of supporting various information handling issues such as, for example, internal information security and external e-commerce applications. Currently available ERM schemes cover a small but growing market, which now includes Microsoft as an emergent player—with their Rights Management Services (RMS) version 1.0 product.

It should be appreciated, however, that ERM is not: (1) traditional access control; (2) consumer DRM which protects consumer content, such as, for example, audio/video, but rather ERM protects sensitive enterprise information (technology can be the same, but usage is not); and (3) absolute, bulletproof protection of information, but rather one pillar in an overarching information protection program which will be implemented to an extent justified by the risk.

An ERM system may comprise a rights server to hold policy information and cryptographic keys that may be usable to implement rights management through for example, a set of rules, a scheme, a methodology, or a hierarchy of rights management capabilities (an "ERM scheme"). Such an ERM scheme may include as tenets: (1) a subject identification methodology which may include, for example, directories or other repositories with identity information, which links to a license; (2) an object identification methodology which is usable to provide, for example, a canonical description of the protected resource; (3) a license format and distribution scheme which involves, for example, a description of what a user is authorized to do with an identified object; and (4) a trust infrastructure for, for example, controlling authentication and key management.

In an environment in which an ERM scheme is established, the processing of information may be undertaken as follows. Rights-protected information is created, e.g. a sensitive e-mail communication. A policy is defined that specifies certain restrictions with regard to the created information. This policy may be stored in rights server. By way of example, the e-mail may be designated as (1) readable only by a specified group of recipients, (2) not capable of being forwarded, and (3) expiring in a set period of time. Users may download ERM client software or activate a rights-enabled application. Users may authenticate themselves to a rights server to receive a license and/or keys to unlock protected information. The ERM scheme will, however, enforce rights and may optionally display rights management information or enforcement information.

In defining an ERM environment, it becomes necessary to define the boundaries of such an environment and then to institute a system of levels of access by which individual users or roles within that environment are allowed to manipulate data, particularly that which will be produced in hard copy.

With this shift in the focus of rights management to ERM and environments within which hard-copy documents may be produced which need to be protected just as they were in their digital and/or electronic form, it may be desirable to automatically apply rights management information when producing and/or reproducing hard-copy documents, such as, for example, when printing, copying, scanning and/or faxing a document.

Exemplary embodiments of disclosed systems and methods may provide a capability whereby a multi-function device (MFD) may automatically initiate a rights management query within a rights management system when rights management metadata is detected in a hard-copy document presented to the MFD. Such capability may be resident within the MFD itself, or otherwise associated with the system or network to which the MFD is connected. Such capability may provide the system or network an ability to autonomously enforce an ERM scheme with respect to hard-copy documents produced and/or reproduced within the electronic environment or specific ERM environment where the system is installed. For example, the system or network could limit a user's access with respect to a given document, or ability to otherwise manipulate the data to be produced as a hard-copy document. In this regard, the term "user" is intended to refer herafter to an individual representing either himself or herself, a group to which they belong, or the individual user's role in performing a given operation performs the operation.

Exemplary embodiments may further provide a capability wherein when a user approaches an MFD within an ERM environment and places a hard-copy document thereon, for example, to be scanned, the MFD automatically recognizes metadata associated with rights management or other access and permissions regarding the document. When such metadata is recognized, the MFD may then automatically impose an ERM scheme to determine if the user-requested function with regard to the document, such as, for example, scanning and/or copying, can be undertaken on this document by this user at this time. It is envisioned that authentication and retrieval of permissions from the ERM system may be automatically performed by an exemplary embodiment of an MFD which includes ERM integration technologies and capabilities as are disclosed herein. Such query to an ERM server or like device may be undertaken prior to, concurrently with, or after, authentication of a user.

Exemplary embodiments may provide a capability whereby ERM data associated with a document, or an applicable sub-portion of a document and not the whole document, may be written onto a hard-copy document produced, and may be separately automatically read from the hard-copy document, in order that the integrity of an ERM system is maintained as information is converted between digital format and hard-copy format.

Exemplary embodiments may further provide MFDs with the ability to recognize ERM data, or other rights management associated metadata, encoded on a hard-copy document when that document is electronically read by the MFD.

Exemplary embodiments may provide an ability to generate hard-copy documents within an ERM environment that will be physically marked and/or otherwise embedded with some form of metadata which includes at least one rights management characteristic usable within the ERM system. Such information may be encoded on a document, or an applicable sub-portion of a document as, for example, Xerox DataGlyphs®, or a machine-readable 2D barcode, or in some other digital and/or machine-readable form which may or may not be visibly detectable.

Exemplary embodiments may provide capabilities whereby rights management information is digitally assigned by a creating user, by the ERM system itself, or by a combination of the two with the assigned rights management information being automatically transferred along with the data or images produced or reproduced as hard-copy output images.

Exemplary embodiments may employ any of a variety of technologies such as, for example, Xerox DataGlyphs® and/or a machine-readable 2D barcode, alone or in combination with XML, XrML, XACML, or similar well-known and well-documented technology, or by another method in order to place on hard-copy documents ERM data pertaining to an entire document, or an applicable sub-portion of the document and not to all of the document.

Simply put, exemplary embodiments of disclosed systems and methods may provide a capability to embed ERM information on hard copy documents in some machine-readable form such that the ERM information can be automatically read and interpreted by an appropriately configured MFD, or may be automatically read by the MFD and otherwise interpreted by a system or network to which the MFD is connected. Such information typically includes an indication of what rights are available to a user, in what particular period of time, under what access conditions, within what territory, with what obligations, or for what fees.

Exemplary embodiments may support an ERM environment in which a plurality of MFDs such as, for example, combination scanner/copier/printers, are networked to be able to exchange information with an ERM server, or ERM server module located within the system environment, to obtain directory information, user authentication and permissions, and document information and permissions associated with an individual document as may have been applied, either by the user or automatically by the system, when the document was originally produced in hard copy.

Exemplary embodiments may further provide an autonomous capability within an MFD to recognize ERM data, possibly presented as metadata, and then to automatically require the user to authenticate himself or herself to the system, or separately to access user pre-authentication which has already been undertaken in a real-time instance and/or previously stored within the system. The MFD may recognize, for example, a software code on the document and automatically run that code. The code may, for example, access the rights management server and enforce those rights by controlling the functionality of the MFD with respect to that document's interaction with the MFD at the time.

Exemplary embodiments may allow ERM rules for a document being scanned, either separately from or in combination with permissions granted to a specific user, to be carried out in automatically determining whether the user's request for a document action may be completed.

Exemplary embodiments may provide a capability for a multi-function device to automatically request a user to authenticate to the ERM system his or her ERM profile when ERM metadata is detected on a hard-copy document.

These and other features and advantages of various disclosed exemplary embodiments are described in, or apparent from, the following detailed description of various exemplary embodiments of systems and methods according to this disclosure.

BRIEF DESCRIPTION OF THE DRAWINGS

Various exemplary embodiments of systems and methods for rights management will be described in detail with reference to the accompanying figures, wherein.

DETAILED DESCRIPTION OF EMBODIMENTS

The following description of various exemplary systems and methods for rights management is undertaken with an understanding that individual actions regarding, for example, automatically recognizing data embedded as metadata in a hard-copy document exists. Separately, there exists an ability to automatically authenticate an individual for access to certain data or functionality, within a digital system, such as by requiring input of a password or the like. Ability, however, to automatically recognize rights management data or instructions in an Enterprise Rights Management (ERM) environment, contained as metadata embedded, or otherwise included in some machine-readable form, in a hard-copy document, and to initiate automatic authentication schemes wherein a user may or may not be allowed to execute an operation regarding that specific hard-copy document, are understood not to exist in currently available technologies. Nor is there a capability to transfer such data onto a document automatically such that when a document is produced in hard copy from a digital environment and is later read by a document reading system, the metadata contained in the hard-copy document is automatically read, interpreted and applied to execution of a user-requested operation regarding that document.

Exemplary systems and methods according to this disclosure may implement, in a partially or fully automated manner, ERM schemes which can provide control over digital documents where it may be desirable to implement certain controls of protected documents in: electronic to paper transformation of data, paper to electronic transformation of data, and ultimately, paper to paper transformation of data. Such control may be applied to an entire document, or an applicable sub-portion of a document and not to the whole document. An applicable sub-portion of a document may be machine-recognizable, or separately identifiable, and may include, for example, simple parts of a document structure such as paragraphs, sections, tables, figures, or chapters, information presented as embedded metadata regarding authorship, date information such as creation or revision date, versions, executive summaries, conclusions, or perhaps detailed product information containing, for example, pricing schemes, parts lists, proprietary pricing data, or other related market information.

It may be desirable that, when a user approaches a multifunction device (MFD) within an ERM environment and places a hard-copy document on a scanner or other document reading device, as an image source to the system or network to which the MFD is attached, the MFD has a capability to recognize rights management information embedded as metadata or otherwise contained in the document. The MFD then automatically reacts according to an ERM scheme for the ERM system within which the MFD operates. ERM schemes can include any now known or later-developed form of user authentication. Such user authentication may be implemented, for example, by a dynamic log-in, through the MFD or otherwise directly to the networked system of which the MFD is a part; by reading user-specific rights management identification and authentication information embedded as metadata on the document identifying an individual user as authorized to undertake the operations requested; or by some other method of user identification and/or authentication. Separately, the system may automatically provide a capability to understand permissions authorizing a user to undertake a specific function or operation regarding that document, or an applicable sub sub-portion of the document and not the entire document.

Figure 1:
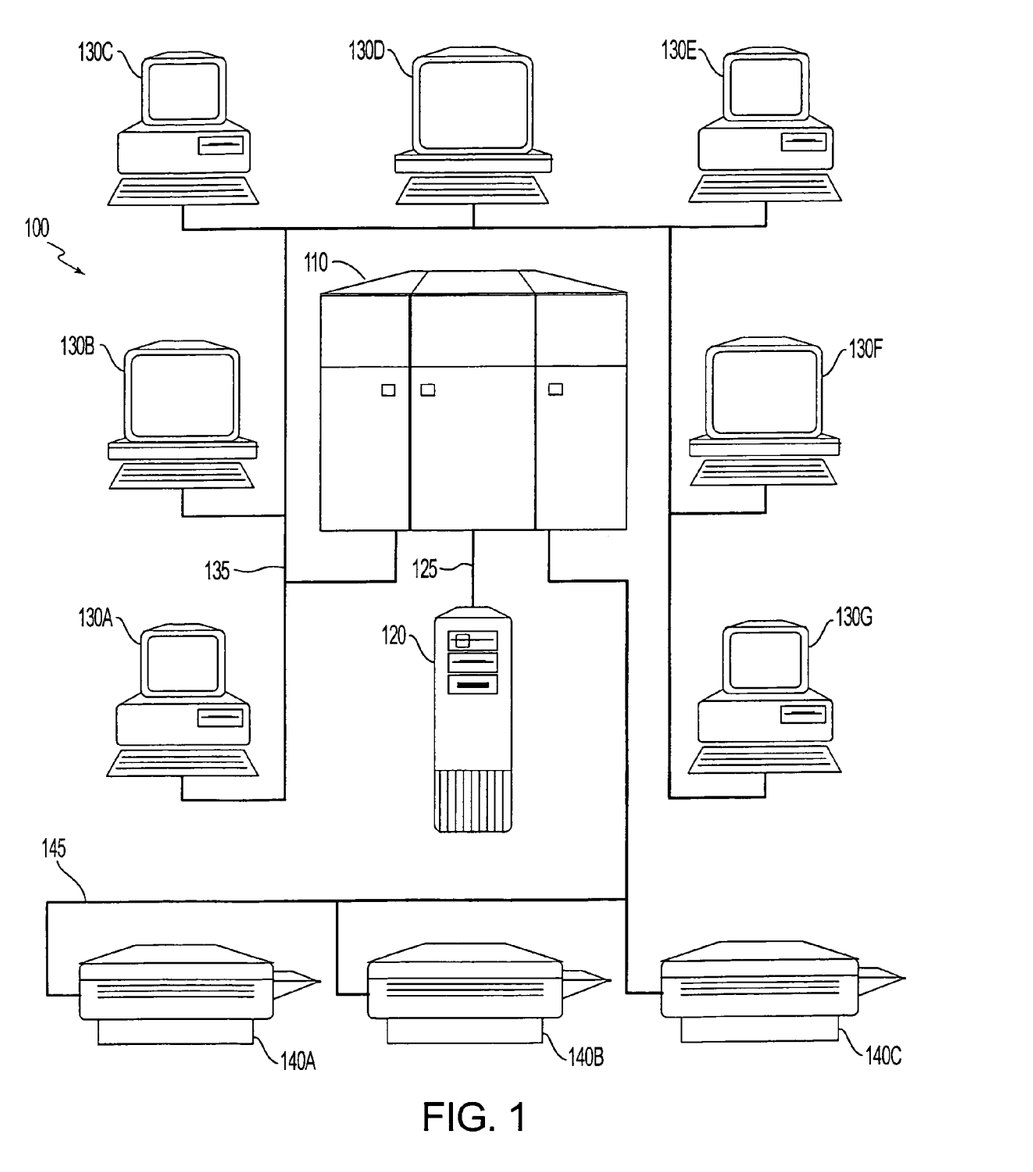
FIG. 1 illustrates a data and/or image production, transfer, reproduction, and control system including an Enterprise Rights Management (ERM) capability useable according to systems and methods of this disclosure.

FIG. 1 illustrates a data and/or image production, transfer, reproduction, and control system ("digital data system") 100 including an Enterprise Rights Management (ERM) capability. As shown in FIG. 1, the exemplary digital data system 100 may include a plurality of workstations 130A-G as data and/or image producing devices where data and/or images are produced in digital form by a plurality of users. Each of the workstations 130A-G may be connected to a central network server 110 via a wireless, wired, or optical network 135. Separately, a plurality of hard-copy image input/output (producing and/or reproducing) devices or image sinks 140A-C may be connected to the central network server 110 via the same network 135, or via a separate network 145. In a rights management or High Integrity Document (HID) production facility, a rights management server 120 (hereinafter referred to as an Enterprise Rights Management server or "ERM server") may be connected separately to the central network server 110 via its own data/control or information exchange bus 125. Though depicted as a separate element, it should be appreciated that the ERM server 120 may exist as a component module within the central network server 110, or such capability may be dispersed among the workstations 130A-G and/or image sinks 140A-C.

In this rights management environment, an author may create content for any document, to include, but not be limited to, any combination of text, data, images, graphs, graphics, other pictures, embedded files, or other related medium, at workstations 130A-G. The user may protect the document through an ERM scheme. The document digital data file is then partially or completely "locked," requiring any of a user and/or system identified password, a data key, or the like, in order to unlock all, or a portion of, the document digital data file containing the locked document data.

In the exemplary digital data system 100, it is contemplated that the image sinks 140A-C may be available to read information from, or generate information as, a hard-copy document, and may include a capability to read rights management information directly and automatically from hard-copy documents which are presented to the MFD to be read, and/or to embed rights management information in some machine-readable form in hard-copy documents produced on the MFD. Such hard-copy documents then may include any form of digitally detectable encoding scheme. Includable information which may be embedded by such digital marking schemes may include any manner of user authentication, user authorization, document descriptive data, document restrictive data, and/or other like information. The information may be embedded onto the document in a machine-readable form which may or may not be visibly detectable by a user. The user may, in fact, be unaware that such an encoding scheme exists on the document at all. Separately, the embedded information may include an additional requirement that it be digitally signed by a user who prints a hard-copy of the document, or by the ERM system controlling the process when a hard-copy of the document is created, or by some combination of the two, in order to track generation or proliferation of hard-copy documents produced from a rights managed digital data file. Ultimately, before any function and/or operation is allowed with regard to a hard-copy document, a user requesting the function and/or operation will be authenticated by the system in some manner, the user's authorization for functions and/or operations to be conducted regarding a specific document will be verified. Any restriction pertaining specifically to the document, or an applicable sub-portion of the document, will be combined with the user's authorized functions and/or operations, per an ERM scheme stored in, for example, the ERM server 120 in communication with a central network server 110 in the digital data system 100.

In exemplary manner then, a document may be produced which describes a product. Individual portions of the descriptive document may include fields which are individually identifiable sections of the document available to the ERM system. Such fields may include, but not be limited to, product specific information, for example, any of a product identification, a specification date, a manufacturing parts list, an assembly specification, parts vendors lists, parts costs listings, product price guides, an authorized or available resellers list, marketing information, and a product coordinator point of contact with any relevant product coordinator notes. Given such an exemplary list, policies and permissions may be assigned as follows: (1) overall document level, product identification and date sections may be available to any user; (2) design group engineers may, for example, access separately only a manufacturing parts list and an assembly specification; (3) manufacturing team personnel may, for example, access only an assembly specification; (4) business team consultants may, for example, access only parts vendors lists, parts costs listings, and product price guides; (5) marketing team individuals may, for example, access product price guides, an authorized or available resellers list, and marketing information; and (6) there may be specific limitedly defined user authorizations to access the name of a product coordinator point of contact and/or product coordinator notes. The exemplary rights management information would be captured on a hard copy of the document in a form not readable by humans on each printed instance of the document based on ERM system settings relating to the product.

Figure 2:
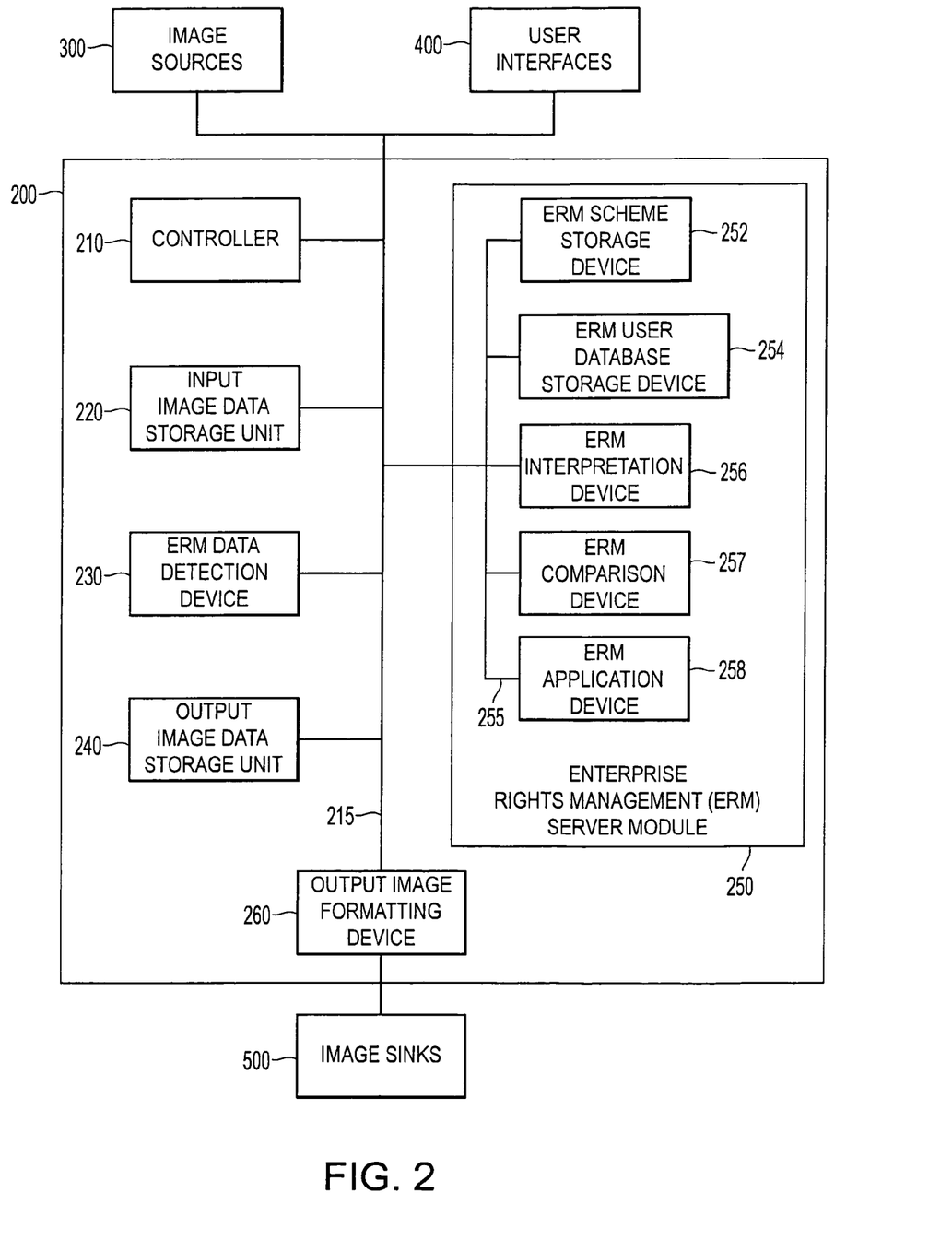
FIG. 2 illustrates a functional block diagram of an exemplary system for performing one or more of ERM recognition, interpretation or application.

FIG. 2 illustrates a functional block diagram of an exemplary system 200 for performing one or more of ERM recognition, interpretation, or application. As shown in FIG. 2, an exemplary ERM system 200 includes one or more image sources 300, one or more user interfaces 400, and one or more image sinks 500 which, although depicted separately, may be combinable in varying combinations. The image sources 300, user interfaces 400, and image sinks 500 are alternatively useable individually, or in varying combinations, to generate and/or input data to the ERM system 200 and to provide capability whereby produced and/or reproduced digital data files may be viewed and/or modified in a digital form according to rights management permissions associated with a particular user and/or a particular document. Where permitted, a document may be output in hard-copy form including ERM data being optionally embedded on the hard-copy document. It is contemplated that such embedded ERM data can later be read and interpreted by compatible devices in order to carry an ERM scheme for the particular ERM environment into operation via hard-copy document transmission of certain ERM information associated with individual documents and/or users.

The exemplary ERM system 200 includes a controller 210, at least one image data storage unit, such as an input image data storage unit 220 and/or an output image data storage unit 240, an ERM data detection device 230, an ERM server or server module 250, and an output image data formatting device 260, all connected via a main data/control bus 215. Such main data/control bus 215 may include at least one wired or at least one wireless or at least one optical connection to any of the involved devices, units, or modules.

An exemplary ERM server module 250 may further include an ERM scheme storage device 252, an ERM user database storage device 254, an ERM interpretation device 256, an ERM comparison device 257, and an ERM application device 258, all of which may be internally connected via a separate data/control bus 255. Each of these components may be alternatively individually, or in varying combinations, connected directly to the main data/control bus 215.

In various exemplary embodiments, a user can generate digital image and/or data documents via a user interface 400. A user may then select, for inclusion as metadata associated with the digital file which will store the image and/or data document, at least one ERM characteristic to be associated with the document. By this selection, the document and/or an applicable sub-portion of the document may be protected against unauthorized functions and/or operations being carried out on the document, or the applicable sub-portion of the document, by communicating with the ERM server module 250 and potentially retrieving, from the ERM server module 250, an ERM scheme stored in an ERM scheme storage device 252. Additional interaction may be automatically undertaken, as required, with an ERM user database storage device 254, an ERM comparison device 257, and an ERM application device 258 in order that the stored digital file containing at least one data and/or image document may include rights management data associated with the document.

Separately, a user may request, for hard-copy production, a stored digital data and/or image document file. When the user attempts to print or otherwise produce the digital file as an output hard-copy document, the ERM server module 250 may be automatically activated by the controller 210. Some form of user authentication may be requested of the user via a user interface 400 in order that the user's authentication information may be compared with user authentication and authorization information stored in the ERM user database storage device 254. Based on a comparison of user-entered user authentication information with information pre-stored within the ERM system 200, the ERM server module 250 may react by determining what authorization the particular user may have. Upon determining whether an individually authenticated user is authorized to perform the specific function requested based on a decision matrix contained within an ERM scheme storage device 252, as executed through an ERM comparison device 257, the requested function and/or operation may be completed. Such completion may include an output image being stored in an output image data storage unit 240 and/or otherwise being immediately formatted for output via an output image formatting device 260 prior to being delivered to an image sink 500. It should be appreciated that prior to the output image being formatted for transmission to the image sink 500, an ERM application device 258 in an ERM server module 250 may apply certain ERM data to the output image data file in order that rights management data associated with the document is embedded in machine-readable form in the produced output hard-copy document.

In contrast, the ERM server module 250, by querying an ERM scheme stored in the ERM scheme storage device 252 combined with information available from an ERM user database available in the ERM user database storage device 254, may determine that a specific user is not authorized to perform a requested function and/or operation on a particular document at a particular time based on any of the user's authentication and authorization, and the document's rights management permissions as automatically interpreted by the ERM system 200. In such case, the function and/or operation requested by the user may be interrupted while the system seeks additional authentication and/or guidance, or the function and/or operation may be wholly aborted by the ERM system 200. In any such instance, the ERM system 200 may provide feedback to the user indicating system interrupt or system abort, and/or the ERM system 200 may produce a separate warning message as may be stored in the ERM scheme storage device 252 within the ERM server module 250. Additionally, instances of users attempting to undertake functions and/or operations for which they do not have proper authorization may be recorded and/or otherwise stored within the ERM system 200, or separately reported in accordance with an ERM scheme as may be stored in the ERM scheme storage device 252 within the ERM server module 250.

Alternatively, a user may approach one of a plurality of image sources 300 which, as noted above, may be combined units including at least one user interface 400 and/or at least one image sink 500. The user may then present a hard-copy data or image document to the image source 300 to be scanned by that image source 300 for input of the data and/or images presented in the hard-copy document into an ERM system 200. Once a document is scanned by an image source 300, the input image data optionally may be stored in, for example, an input image data storage unit 220. An ERM data detection device 230 resident in the image source 300 or, as depicted, residing separately in the ERM system 200, may detect or "recognize" the presence of ERM data in the scanned source data or image document. Such ERM data may or may not be visible to a reader and, in fact, the requesting user operating the image source 300 may be wholly unaware that such embedded ERM data is even present in the document.

Once such ERM data is read or recognized by the ERM system 200, the ERM server module 250 may be automatically activated and an ERM user database in the ERM user database storage device 252 may be queried in order to determine whether the user has been authenticated by the ERM system 200 and to determine what authorizations the particular user has. The read or recognized ERM data is interpreted via an ERM interpretation device 256 in order that an ERM scheme available from an ERM scheme storage device 252 may be employed based on some comparison between the permissions detected in the document and the authorizations and constraints in the database as accomplished by an ERM comparison device 257. As above, the ERM server module 250 may autonomously determine that the individual user, appropriately authenticated, is authorized to perform the requested function and/or operation. The exemplary ERM system 200 would, in such instance, allow the individual user to perform the requested function and/or operation, for example, storing and/or reproducing the hard-copy document via the ERM system 200 for delivery to an output image sink 500. The system may automatically determine that the individual user is not authorized to perform the requested function and/or operation and the ERM interpretation device 256 may, in concert with the ERM scheme stored in the ERM scheme storage device 252, interrupt or otherwise abort the function and/or operation which the user is attempting to carry out. In such instance, a warning or notification, as discussed above, may be output or recorded to alert others of an unauthorized access or use attempt.

It should be appreciated that, while shown in FIG. 2 as a single composite unit internal to the exemplary ERM system 200, the ERM server module 250 may be either a unit and/or capability internal to the ERM system 200, internal to any component of the ERM system 200, or may be separately presented as a stand-alone system, unit, or device such as, for example, a separate server connected to the ERM system 200. Further, it should be appreciated that each of the individual elements depicted as part of the exemplary ERM system 200 may be implemented as part of a single composite unit or as individual separate devices. For example, the image sources 300, user interfaces 400, and image sinks 500 may be integral to a single composite unit representing the overall system. Further, as noted above, it should be appreciated that, while depicted as separate units, the image sources 300, user interfaces 400, and image sinks 500 may be separately attachable to the system as composite multi-function input/output components such as, for example, multi-function devices which include scanner/copier/facsimile/printer capability all within a single unit with a user interface as part of the single composite unit.

It should be appreciated that given the required inputs, software algorithms, hardware circuits, and/or any combination of software and hardware control elements, may be used to implement the individual devices and/or units in the exemplary ERM system 200 and specifically the individual components of the exemplary ERM server module 250.

It should be appreciated further that any of the data storage devices depicted in FIG. 2, or otherwise as described above, can be implemented using any appropriate combination of alterable, volatile or non-volatile memory, or non-alterable, or fixed, memory. The alterable memory, whether volatile or non-volatile can be implemented using any one or more of static or dynamic RAM, a floppy disk and associated disk drive, a writeable or re-writeable optical disk and associated disk drive, a hard drive/memory, and/or any other like memory and/or device. Similarly, the non-alterable of fixed memory can be implemented using any one or more of ROM, PROM, EPROM, EEPROM and optical ROM disk, such as a CD-ROM or DVD-ROM disk and compatible disk drive or any other like memory storage medium and/or device.

Figure 3:
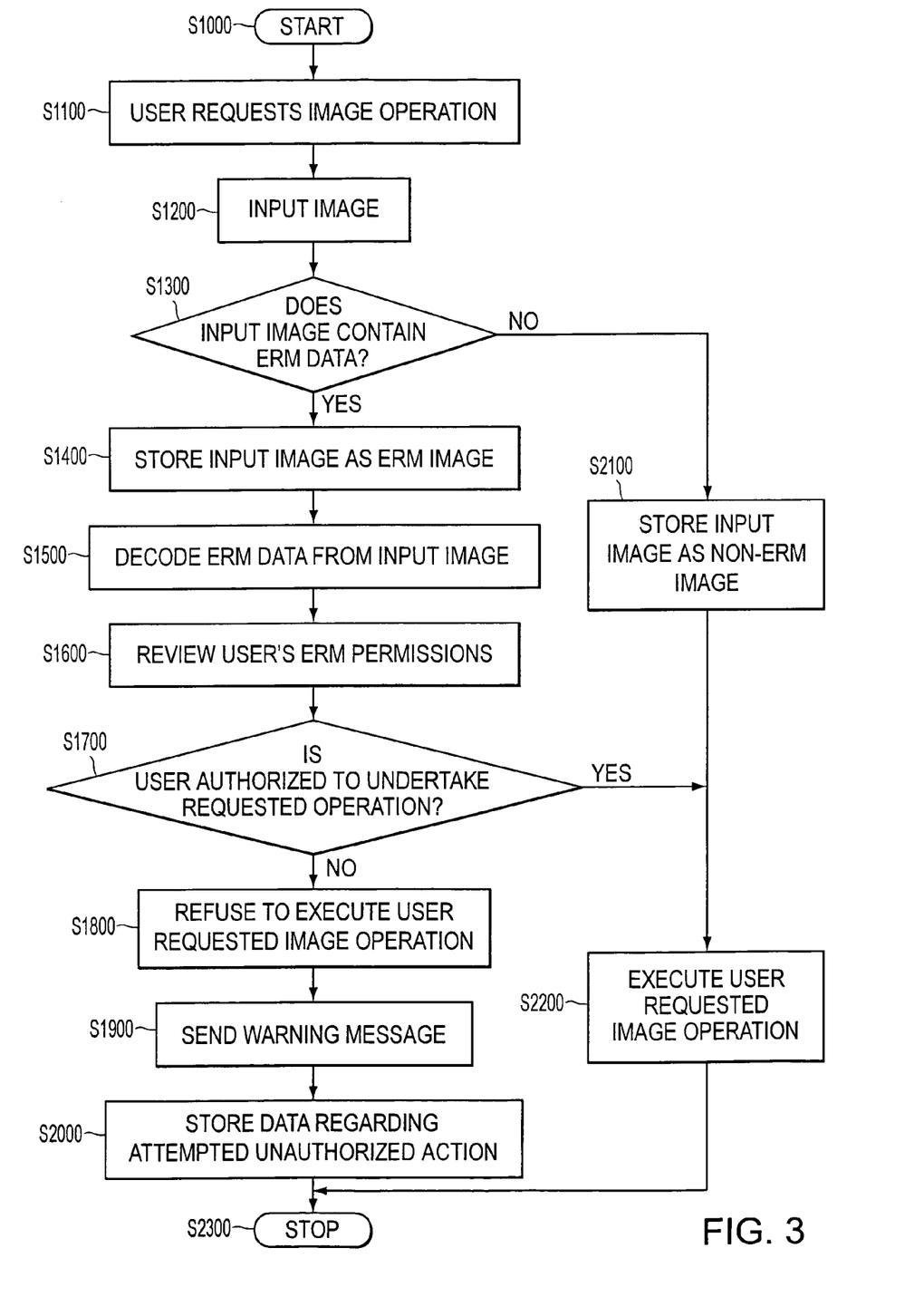
FIG. 3 is a flowchart of an exemplary method for performing one or more of recognizing, interpreting, or applying rights management information, particularly regarding an ability to read ERM data embedded in a hard-copy document or to write ERM data to, or otherwise embed ERM data in, a hard-copy document.

FIG. 3 is a flowchart of an exemplary method for recognizing, interpreting, and applying rights management information, particularly regarding an ability to read ERM data embedded in a hard-copy document or to write to a hard-copy document embedded ERM data.

It will be appreciated that, while depicted in a single flowchart, different systems or devices may independently perform different parts of the method. For example, the device may perform steps S1000-S1100 and S2100 and another device may perform steps S1500-S2000 and S2200.

As shown in FIG. 3, operation of the method commences at step S1000. Operation of the method proceeds to step S1100.

In step S1100, a user requests an image operation. Such a request may be communicated to an exemplary system by an individual user manipulating the user input or other controls of a multi-function device such as, for example, a combined scanner/printer/copier/facsimile device, or otherwise through an appropriate user interface such as, for example, any manner of digital input/output device by which an individual user may communicate with an exemplary system. Operation of the method proceeds to step S1200.

In step S1200, a user causes, in some manner, an image to be input to the system. Step S1200 may include, but is not limited to, presenting a hard-copy image to a scanner, copier, or other hard-copy document scanning device to be scanned, in order that the images and/or data present in the document may be input into the exemplary system. Alternatively, a user may request a stored digital data file which includes image and/or data documents to be manipulated by the system. Operation of the method proceeds to step S1300.

Step S1300 is a determination step in which the system determines whether the user-requested input image contains ERM or other embedded rights management data and/or information. If the determination is made in step S1300 that the input image and/or data document does not contain any ERM or other individual rights management data and/or information, operation of the method continues to optional step S2100 or directly to step S2200.

In optional step S2100, input image data, not previously stored, may be stored in an appropriate storage device or unit. In such instance, because the input image contained no ERM data, no additional ERM data will be stored as part of the stored digital image file. Operation of the method continues to step S2200.

In step S2200, because it has been determined in step S1300 that the input image contains no ERM data, there is no reason to involve any ERM scheme otherwise stored within the system into the image or image document function and/or operation as requested by the user. As such, the system, in step S2200, is allowed to proceed with execution of the user requested image function and/or operation. Operation of the method continues to step S2300 where the operation of the method stops.

If the determination is made in step S1300 that the input image document and/or input image data file contains ERM or other rights management data and/or information, the operation of the method proceeds to optional step S1400 or directly to step S1500.

In optional step S1400, the input image data may be stored. Because the input image data has been determined to have ERM or other rights management data and/or information associated with it, the digital data file that stores the digital document containing the input image data and/or images will include, possibly as metadata in the digital data file, the associated ERM or other rights management data and/or information detected in the input image and/or input image data file. Operation of the method continues to step S1500.

In step S1500, detected ERM or other rights management data and/or information is decoded for interpretation by a stored ERM or other rights management set of rules, scheme, methodology, or hierarchy. Operation of the method continues to step S1600.

In step S1600, the individual requesting user's ERM or other rights management permissions, constraints, and/or authorizations are reviewed based on some previously input or concurrently queried identification of the user to the system. For example, the individual user may have been pre-authenticated by the system by a system standard user log-on scheme. As another example, at this point in the method, a specific user authentication request may be initiated by the system through a compatible user interface which allows the user to input specific authentication data in response to such a request, or by another available authentication method. Once authenticated, the individual user's permissions for undertaking functions and/or operations with regard to the system as a whole, or as may be delineated within embedded ERM or other rights management data and/or information contained in the specific document, are imposed. Operation of the method continues to step S1700.

Step S1700 is a determination step in which it is determined whether a properly authenticated user under the ERM scheme imposed by the system is authorized to undertake the requested function and/or operation regarding the specific data and/or image document and each of the identified and controlled sub-portions of the document for which the individual user has requested to undertake the function and/or operation. In step S1700, if a determination is made that the individual user is authorized to undertake the specific function and/or operation regarding this particular document with ERM and/or other rights management data and/or information associated with the document, operation of the method continues to step S2200. As noted above, step S2200 provides that the system will allow the user requested function and/or operation to be undertaken with regard to this specific data and/or image document.

In step S1700, if a determination is made that this specific user is not authorized to undertake the requested function and/or operation regarding this specific document and each of the identified and controlled sub-portions of the document with ERM and/or other rights management data associated, operation of the method continues to step S1800.

In step S1800, the system automatically refuses to execute the user requested function and/or operation regarding this particular document at this particular time. In such case, the operation of the method may be momentarily interrupted or wholly aborted. Operation of the method continues to optional step S1900, optional step S2000, or directly to step S2300.

In optional step S1900, once the user requested function and/or operation regarding the particular image source document has been interrupted or aborted, appropriate system information and/or warning messages may be sent to a user interface for immediate review and/or response by the requesting user, or may be otherwise generated and disseminated to an appropriate receiving node otherwise located within the system such as, for example, record logs, system administrators' account mailboxes, or direct to security personnel or the like. Alternately or in addition, some subset of the request operation may instead be offered to the user or performed instead in accordance with a default or configurable policy within the ERM scheme. Step S1900, therefore, may provide immediate feedback to the requesting user indicating that his or her attempt at a function and/or operation regarding that document is partially or wholly unauthorized, or may otherwise inform other system users and/or administrators regarding an attempt at a function and/or operation by an unauthorized user with regard to a specific document. Such administrative and/or warning messages may be as simple or as complex as the exemplary system's capability and/or user's needs may dictate. Operation of the method continues to optional step S2000 or directly to step S2300 where the operation of the method stops.

In optional step S2000, data regarding the attempted unauthorized action may be optionally stored within the system for later query and/or other use. Operation of the method continues to step S2300 where the operation of the method stops.

It should be appreciated that while exemplary embodiments according to this disclosure have been described in specific applications, disclosed systems and methods are meant to be illustrative and as such, not limited to any specific individual device or networked application but may be applied to virtually any context in which an automated system may read embedded rights management information from any form of hard-copy document. For example, an identification card, a library card, a driver's license, other forms of professional licenses, documents, image documents, credit cards, or any like hard-copy medium are contemplated. Additionally, an ability to embed such information via a printer into any such document where such embedded information may or may not be visible to a user or reader of the document, or may be otherwise undetectable by a user or reader, but which information is available in a machine-readable form in documents or other printed or image media produced by any system are equally contemplated.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for rights management, comprising:
   an imaging device that obtains image data from a hard-copy document, the hard-copy document having rights management information embedded thereon;
   a user interface that allows a user to at least one of (a) enter user authentication information or (b) request an operation to be executed by the system;
   a detection device that detects the rights management information in the obtained image data of the hard-copy document; and
   a rights management device that automatically carries out a rights management scheme regarding the hard-copy document based on the detected rights management information wherein detected rights management information applies to only one or more applicable sub-portions of the hard-copy document, and not to all of the hard-copy document, and the rights management device automatically carries out the rights management scheme regarding the applicable sub-portions of the hard-copy document by preventing unauthorized functions, unauthorized operations or unauthorized access to the one or more applicable sub-portions based on detected rights management information.

2. The system of claim 1, further comprising:
   an output image formatting device usable to format an output image to include rights management data to be transferred to an image sink; and
   an image sink for producing output image documents including rights management data.

3. The system of claim 2, the rights management device further comprising an application device which, when the user-requested operation includes producing a hard-copy output image document, applies rights management information to the output image by forwarding the rights management information to be embedded in the output image document to the output image formatting device to be formatted as a composite image prior to the output image being transferred to the image sink.

4. The system of claim 3, wherein the rights management information to be embedded in the output image document applies to only one or more applicable sub-portions of the output image document, and not to all of the output image document.

5. The system of claim 1, the rights management device further comprising:
   a scheme storage device that stores the rights management scheme that includes at least one of (a) a rights management set of rules; (b) a rights management set of system permissions, (c) a rights management set of system constraints, (d) a rights management methodology, or (e) a rights management hierarchy;
   a user database that stores user data including at least one of (a) authorized user authentication information or (b) authorized user permissions for the system;
   an interpretation device that decodes the detected rights management information; and
   a comparison device that compares stored user data with detected and decoded rights management information and implements the rights management scheme over the user-requested operation regarding the hard-copy document based on the comparison.

6. The system of claim 5, wherein, based on the comparison in the comparison device, the user-requested operation is executed, interrupted, or aborted.

7. The system of claim 6, wherein when a user-requested operation is executed, interrupted or aborted, a message is generated and the message is at least one of (a) displayed to the user via the user interface, (b) stored in the system for later recall, or (c) transmitted to an appropriate receiving node for further action.

8. The system of claim 5, wherein, based on the comparison in the comparison device, the user-requested operation is executed, interrupted, or aborted with regard to only one or more applicable sub-portions of the hard-copy document to which the detected and decoded rights management information applies, and not the whole of the hard-copy document.

9. The system of claim 1, wherein the rights management information is included in the input image of the hard-copy document.

10. The system of claim 9, wherein the rights management information in the obtained image of the hard-copy document is in a form that is machine-readable.

11. The system of claim 10, wherein the machine-readable form is at least one of XML, XrML, or XACML, or another type of rights expression language.

12. The system of claim 10, wherein the machine-readable form is at least one of Xerox DataGlyphs®, or a machine-readable 2D barcode.

13. The system of claim 9, wherein the rights management information is undetectable by the user or a human reader when looking at the hard-copy document.

14. The system of claim 1, further comprising at least one storage device that stores image data.

15. An image forming device including the system of claim 1.

16. A multi-function image producing or reproducing device including the system of claim 1.

17. A xerographic device including the system of claim 1.

18. The system of claim 1, wherein the rights management information embedded on the hard-copy document is not visible to the user.

19. A method for rights management, comprising:
   obtaining an image from a hard-copy document;
   receiving a user request for an operation to be executed with respect to the obtained image;
   a detecting, in the obtained image, rights management information; and automatically carrying out a rights management scheme regarding the user-requested operation with respect to the obtained image based on the detected rights management information wherein automatically carrying out the rights management scheme comprises at least one of executing interrupting, or aborting the user requested operation with regard to only one or more applicable sub-portions of the hard-copy document to which the detected rights management information applies, and not to all of the hard-copy document.

20. The method of claim 19, wherein automatically carrying out the rights management scheme comprises at least one of executing, interrupting, or aborting the user-requested operation.

21. The method of claim 19, further comprising:
formatting an output image when the user-requested operation includes production of a hard-copy output document; and
delivering an appropriately formatted output image to a suitable image sink to produce the output image as the hard-copy output document.

22. The method of claim 21, further comprising embedding rights management information as part of a composite image with the output image to be produced as the hard-copy output document.

23. The method of claim 22, wherein the embedded rights management information applies to only one or more applicable sub-portions of the hard-copy output document, and not to all of the hard-copy output document.

24. The method of claim 22, wherein the embedded rights management data is undetectable by the user or a human reader when looking at the hard-copy output document.

25. The method of claim 22, wherein the embedded rights management information is in a form that is machine-readable.

26. The method of claim 25, wherein the machine-readable form is at least one of XML, XrML, or XACML, or another type of rights expression language.

27. The method of claim 25, wherein the machine-readable form is at least one of Xerox DataGlyphs® or a machine-readable 2D barcode.

28. A digital data storage medium on which is stored a program for implementing the method of claim 19.

29. The method of claim 19, wherein the image is obtained from a hard-copy document having rights management information embedded thereon.

30. The method of claim 29, wherein the rights management information embedded on the hard-copy document is not visible to the user.

* * * * *